H. B. ANDERSON.
POULTRY DRINKING FOUNTAIN.
APPLICATION FILED DEC. 31, 1908.
928,836.
Patented July 20, 1909.
2 SHEETS—SHEET 2.
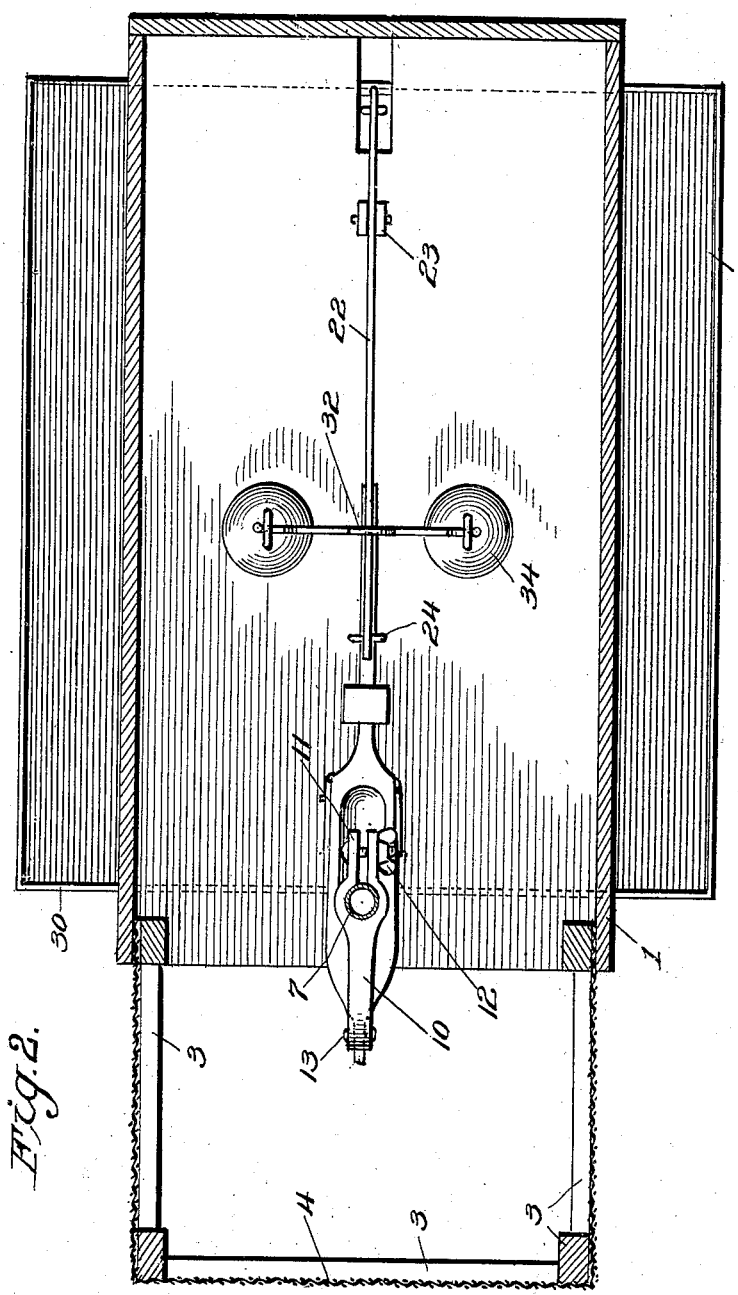
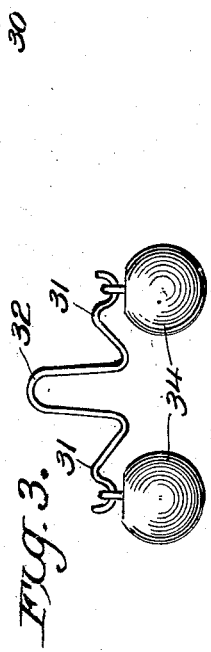
Witnesses
Jos. A. Ryan
Inventor
Heartwell B. Anderson
By Victor J. Evans
Attorney

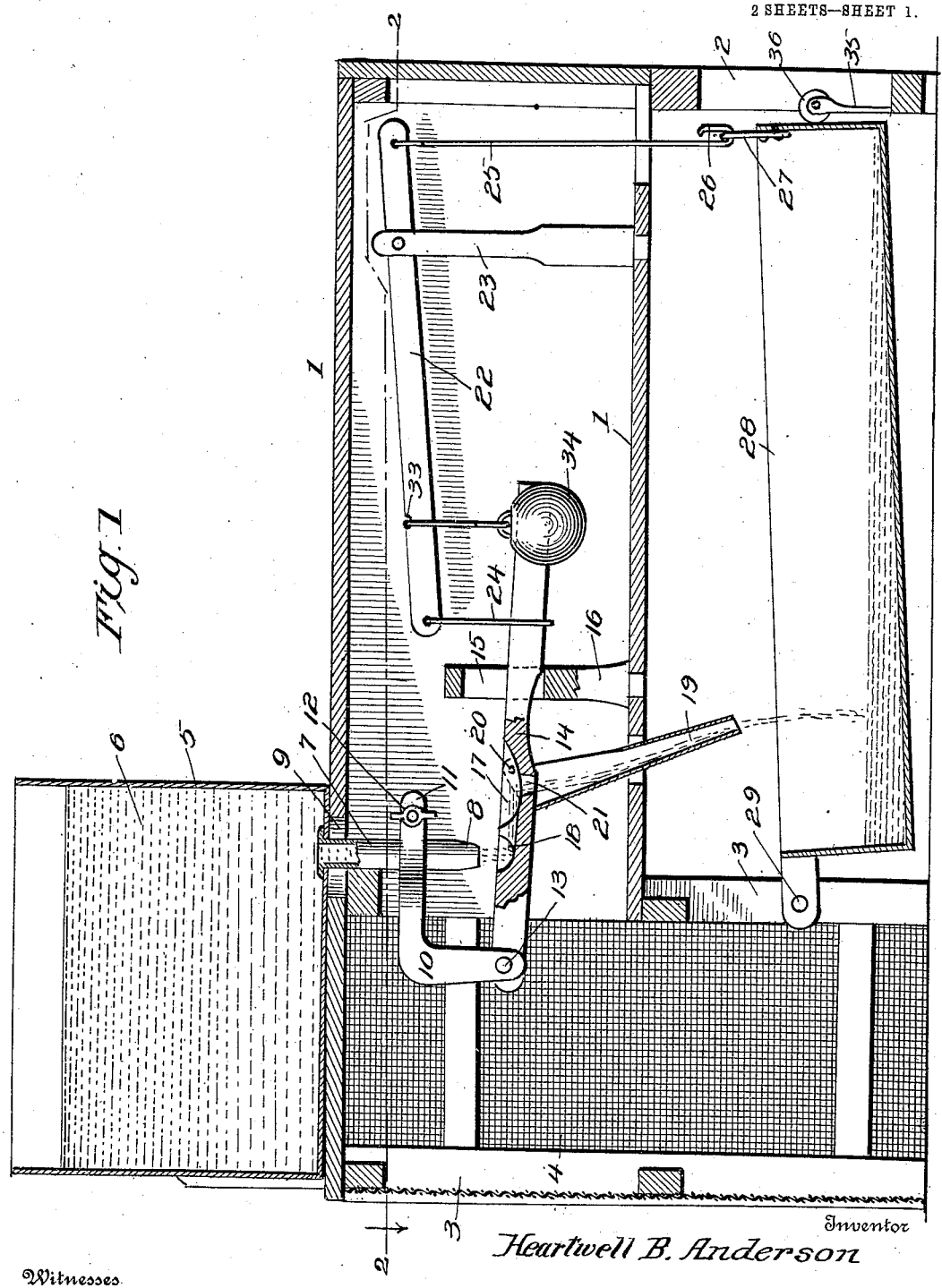

UNITED STATES PATENT OFFICE.

HEARTWELL B. ANDERSON, OF LAMPASAS, TEXAS.

POULTRY DRINKING-FOUNTAIN.

No. 928,836.  Specification of Letters Patent.  Patented July 20, 1909.

Application filed December 31, 1908. Serial No. 470,183.

*To all whom it may concern:*

Be it known that I, HEARTWELL B. ANDERSON, a citizen of the United States of America, residing at Lampasas, in the county of Lampasas and State of Texas, have invented new and useful Improvements in Poultry Drinking-Fountains, of which the following is a specification.

This invention relates to poultry drinking fountains, and one of the principal objects of the same is to provide means whereby fresh water is fed automatically from a tank to a trough in the quantity required, means being provided for shutting off the flow of water when a sufficient quantity has been fed to the trough.

Another object of the invention is to provide a pivoted trough, a water tank and means between the trough and tank for feeding water from the tank to the trough and for shutting off the flow by the weight of the tank and water when a sufficient quantity has been fed.

It is very desirable that poultry should be provided with fresh drinking water, and in order that this may be accomplished some means must be provided whereby the water trough will be resupplied when the water has been consumed, and it is one of the objects of my invention to provide improved means for attaining this result.

In the accompanying drawing,—Figure 1 is a longitudinal sectional view of a poultry drinking fountain made in accordance with my invention. Fig. 2 is a horizontal sectional view on the line 2—2 of Fig. 1. Fig. 3 is a side elevation of the weight.

Referring to the drawing, the numeral 1 designates a housing within which the operative mechanism of the fountain is disposed, said housing being mounted upon a suitable supporting frame 2 provided with an extended inclosure 3 covered with wire gauze 4. On the top of the housing 1 is placed a suitable water tank 5 for holding a quantity of water 6. Extending through the bottom of the water tank 5 is a hollow discharge spout 7, the lower end 8 of which is tapered for a purpose which will presently appear. The spout 7 extends through an opening 9 in the top of the housing 1. Connected to the spout 7 is an elbow lever 10, said lever having a bifurcated front end 11, the two members of which are connected together by means of a bolt and thumb nut 12. The downwardly extending arm of the lever 10 is pivoted at 13 to a member 14 extending through a slot 15 in a bracket 16 secured to the bottom of the housing 1, said member having a concaved water duct 17 formed in its upper face and a connected valve seat 18 to receive the tapered end 8 of the spout 7 which forms a valve to cut off the water supply when said member 14 is raised into contact with the tapered end 8 of the spout 7. A discharge nozzle 19 is pivoted at 20 to the member 14 immediately under a discharge opening 21 through which the water is fed to said nozzle.

A lever 22 pivoted to an upright 23 is provided at its inner end with a wire loop 24 through which the member 14 extends, the opposite end of said lever being provided with a connecting rod 25 which extends through the bottom of the housing 1 and is provided with a hook 26 designed to engage a loop 27 secured to one end of the water container 28. This water container is pivoted at 29 to the framework 3. As shown in Fig. 2, the water container extends at opposite sides of the housing 1 to form water troughs 30 to which the poultry can have ready access. The nozzle 19 is disposed above the water container. A counterweight comprising the two arms 31 and the intermediate loop 32 is engaged in a notch 33 in the lever 22, the balls or weights 34 being disposed at opposite sides of the member 14. A bracket 35 is provided with a roller 36 at its upper end which bears against the end of the water container 28 to insure a smooth action of the water container.

The operation of my invention may be briefly described as follows:—Water having been placed in the tank 5, it will flow through the spout 7 into the member 14 and from thence through the nozzle 19 into the water container 28. When a sufficient quantity has been fed to the container 28 the weight of the water will pull downward upon the rod 25 to raise the inner end of the lever 22, and the loop 24 will raise the member 14 until the tapered end 8 of the nozzle 7 is disposed firmly within the seat 18, thus cutting off the supply of water from the tank 5 to the container 28 until such time as the water has been consumed by the poultry or evaporated from the troughs 30. When the container 28 has been reduced in weight by the removal of the water therein, the counterweight will raise the outer end of the container, and the member 14 will drop to the position shown in Fig. 1, when the water will commence to feed from the tank 5 to the container 28.

From the foregoing, it will be obvious that my poultry fountain operates automatically to feed water from a tank to a container or trough and that by moving the weight upon the lever 22 the feed may be regulated. The device will operate automatically, can be produced at slight cost and cannot readily get out of order.

I claim:—

1. A poultry drinking fountain comprising a frame, a water tank disposed upon the frame, a water container pivoted at one end to the frame, a spout connected to the tank and provided with a tapered end, a member pivoted underneath said spout and provided with a concaved seat for the tapered end of said spout, a nozzle connected to said member and disposed above the water container, and a weighted lever connected at one end to the water container and the opposite end provided with a loop for engaging said member to raise the same and to close off the water when a predetermined amount has been deposited in the water container.

2. A poultry drinking fountain comprising a frame, a housing mounted on the frame, a water tank supported on the housing, a water container pivoted to the frame, a lever pivoted within the housing, means for connecting said lever to said water container, a water spout communicating with the water tank, a member provided with a seat for the end of said spout, and means connected to said lever for raising said member up against the end of said spout.

In testimony whereof I affix my signature in presence of two witnesses.

HEARTWELL B. ANDERSON.

Witnesses:
K. E. RINGER,
W. E. LIRCHY.